(12) United States Patent
Higgins

(10) Patent No.: US 11,947,522 B2
(45) Date of Patent: Apr. 2, 2024

(54) METHOD AND SYSTEM FOR PRUNING BLOCKS FROM BLOCKCHAINS FOR DATA RETENTION AND STORAGE SCALABILITY PURPOSES

(71) Applicant: MASTERCARD INTERNATIONAL INCORPORATED, Purchase, NY (US)

(72) Inventor: Stephen Higgins, County Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 232 days.

(21) Appl. No.: 17/452,492

(22) Filed: Oct. 27, 2021

(65) Prior Publication Data

US 2023/0129559 A1 Apr. 27, 2023

(51) Int. Cl.
*G06F 16/00* (2019.01)
*G06F 16/23* (2019.01)

(52) U.S. Cl.
CPC .............................. *G06F 16/2379* (2019.01)

(58) Field of Classification Search
CPC .... G06F 16/2379; G06F 16/184; G06F 16/27; G06F 16/1834; G06F 16/2365; H04L 63/12; H04L 9/3247; H04L 9/3297; H04L 9/50
See application file for complete search history.

(56) References Cited

U.S. PATENT DOCUMENTS

| | | | | |
|---|---|---|---|---|
| 10,628,454 B2* | 4/2020 | Gauvreau, Jr. | ......... | G06F 21/60 |
| 10,896,171 B2* | 1/2021 | Winarski | ............ | G06F 16/2246 |
| 10,992,459 B2* | 4/2021 | Lu | ......................... | H04L 9/0637 |
| 11,036,395 B2* | 6/2021 | Karame | ................ | G06F 3/0608 |
| 11,171,774 B2* | 11/2021 | Wood | ....................... | H04L 9/088 |
| 2020/0076571 A1 | 3/2020 | Natarajan et al. | | |
| 2020/0228316 A1 | 7/2020 | Cahill | | |
| 2021/0089422 A1* | 3/2021 | Kim | .................... | G06F 11/3079 |
| 2022/0284008 A1* | 9/2022 | Treitlinger | .......... | G06F 16/2379 |

FOREIGN PATENT DOCUMENTS

WO 2020078594 A1 4/2020

OTHER PUBLICATIONS

International Search Report dated Dec. 16, 2022, corresponding to PCT/US2022/043210 (11 Pages).

\* cited by examiner

*Primary Examiner* — Debbie M Le
(74) *Attorney, Agent, or Firm* — Panitch Schwarze Belisario & Nadel LLP

(57) ABSTRACT

A method for confirming configuration of a new current genesis block in a blockchain configured to enable pruning before the new current genesis block includes: receiving, by a blockchain node in a blockchain network, a genesis response message from another node in the network, the message including a configuration value and an ordinal value; identifying a plurality of standard blocks in the blockchain added subsequent to an earlier genesis block that includes a number preceding the ordinal value; aggregating smart contract state changes from each of the identified plurality of standard blocks; and validating the configuration value included in the received genesis response message based on the aggregated smart contract state changes. The aggregating of smart contract states can be done by the processor of the blockchain node configuring the new current genesis block, or by another blockchain node.

6 Claims, 7 Drawing Sheets

METHOD AND SYSTEM FOR PRUNING BLOCKS FROM BLOCKCHAINS FOR DATA RETENTION AND STORAGE SCALABILITY PURPOSES

FIELD

The present disclosure relates to the pruning of a blockchain, specifically the use of current genesis blocks, configuration values, and a state database to enable continual pruning of blocks in a blockchain without affecting immutability, smart contracts, and transaction validation.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing a degree of anonymity as to the individuals or entities involved in a transaction. One of the more popular aspects of a blockchain is that it is an immutable record: every transaction ever that is part of the chain is stored therein and cannot be changed due to the computational requirements and bandwidth limitations, particularly as a chain gets longer and a blockchain network adds more nodes.

However, these same attributes can result in blockchains reaching significant data sizes that make transmission or even local storage inefficient or impossible. For instance, a blockchain with enough blocks or where a plurality of blocks store significant data can take up gigabytes of space, which may become impractical over time. Traditional blockchains, being immutable, often have no ability for the data size to be reduced in any meaningful way. As a result, some methods have been developed that may enable blocks to be removed from storage for some nodes. However, these methods often rely on at least some nodes retaining a full copy of the blockchain for use in validations, where nodes that do not retain the full copy may be unable to validate transactions whose inputs could be found on pruned blocks. In such methods, the reduced data size may be, as a result, ineffectual in many cases and impractical in others.

Thus, there is a need for a technological improvement to blockchains that allows for pruning of blocks while still enabling every node to be able to validate all new transactions without the need for any nodes to retain a full copy of the blockchain.

SUMMARY

The present disclosure provides a description of systems and methods for processing new blockchain transactions and confirming new genesis blocks in a blockchain configured to enable pruning behind any given genesis block in the blockchain. In the blockchain, a new, current genesis block is chosen periodically, where the current genesis block, once chosen, may include a configuration value that is an aggregation of the current state of smart contracts and, in some cases, unspent transaction outputs. Using the methods discussed herein, the current genesis block enables new transactions or executions of smart contracts to be successfully validated and processed without the need for any preceding blocks, enabling every blockchain node to prune those blocks. In some cases, blockchain nodes may maintain a state database, which may store unspent transaction outputs and relevant data, which may enable a blockchain node to validate a transaction whose inputs may correspond to outputs of transactions in pruned blocks, which may result in such transactions being successfully validated and added to the blockchain without the need for configuration data of new genesis blocks to include such data. In both instances, every blockchain node in a blockchain network can prune old blocks without adversely affecting the ability to validate new transactions and execute smart contracts, providing for a significant reduction in file size for all nodes without costing any relevant functionality.

A method for processing a new blockchain transaction in a blockchain configured to enable pruning prior to a current genesis block includes: receiving, by a receiver of a blockchain node in a blockchain network, a new blockchain transaction, the new blockchain transaction including at least one or more transaction inputs and one or more transaction outputs; validating, by a processor of the blockchain node, the new blockchain transaction, wherein validating the new blockchain transaction includes validating that each of the one or more transaction inputs is unspent; generating, by the processor of the blockchain node, a new block, wherein the new block includes at least a block header and one or more blockchain data values, one of the one or more blockchain data values including the new blockchain transaction; transmitting, by a transmitter of the blockchain node, the generated new block to a plurality of additional nodes in the blockchain network; and storing, in a memory of the blockchain node, the one or more transaction outputs in a state database associated with the blockchain.

A method for confirming configuration of a new current genesis block in a blockchain configured to enable pruning before the new current genesis block includes: receiving, by a receiver of a blockchain node in a blockchain network, a genesis response message from another node in the blockchain network, the genesis response message including at least a configuration value and an ordinal value; identifying, by a processor in the blockchain node, a plurality of standard blocks in the blockchain added subsequent to an earlier genesis block that includes a number preceding the ordinal value; aggregating, by a processor of a blockchain node, smart contract state changes from each of the identified plurality of standard blocks; and validating, by the processor of the blockchain node, the configuration value included in the received genesis response message based on the aggregated smart contract state changes. The aggregating of smart contract states can be done by the processor of the blockchain node that is configuring the new current genesis block, or by another blockchain node.

A system for processing a new blockchain transaction in a blockchain configured to enable pruning beyond a current genesis block includes: a blockchain network, a plurality of additional nodes in the blockchain network; and a blockchain node in the blockchain network including a receiver receiving a new blockchain transaction, the new blockchain transaction including at least one or more transaction inputs and one or more transaction outputs, a processor validating the new blockchain transaction, wherein validating the new blockchain transaction includes validating that each of the one or more transaction inputs is unspent, and generating a new block, wherein the new block includes at least a block header and one or more blockchain data values, one of the one or more blockchain data values including the new blockchain transaction, a transmitter transmitting the generated new block to the plurality of additional nodes in the blockchain network, and a memory storing the one or more transaction outputs in a state database associated with the blockchain.

A system for confirming configuration of a new current genesis block in a blockchain configured to enable pruning before the new current genesis block includes: a blockchain network; an another node in the blockchain network; and a blockchain node in the blockchain network including a receiver receiving a genesis response message from another node in the blockchain network, the genesis response message including at least a configuration value and an ordinal value, and a processor identifying a plurality of standard blocks in the blockchain added subsequent to an earlier genesis block that includes a number preceding the ordinal value, aggregating smart contract state changes from each of the identified plurality of standard blocks, and validating the configuration value included in the received genesis response message based on the aggregated smart contract state changes.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A shared ledger of all transactions of a blockchain-based transaction, whether currency, provenance, legal or medical records, or nearly any other form of transaction. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency, but rather a broad range of data transactions.

System for Maintaining and Utilizing a Pruned Blockchain

Figure 1:
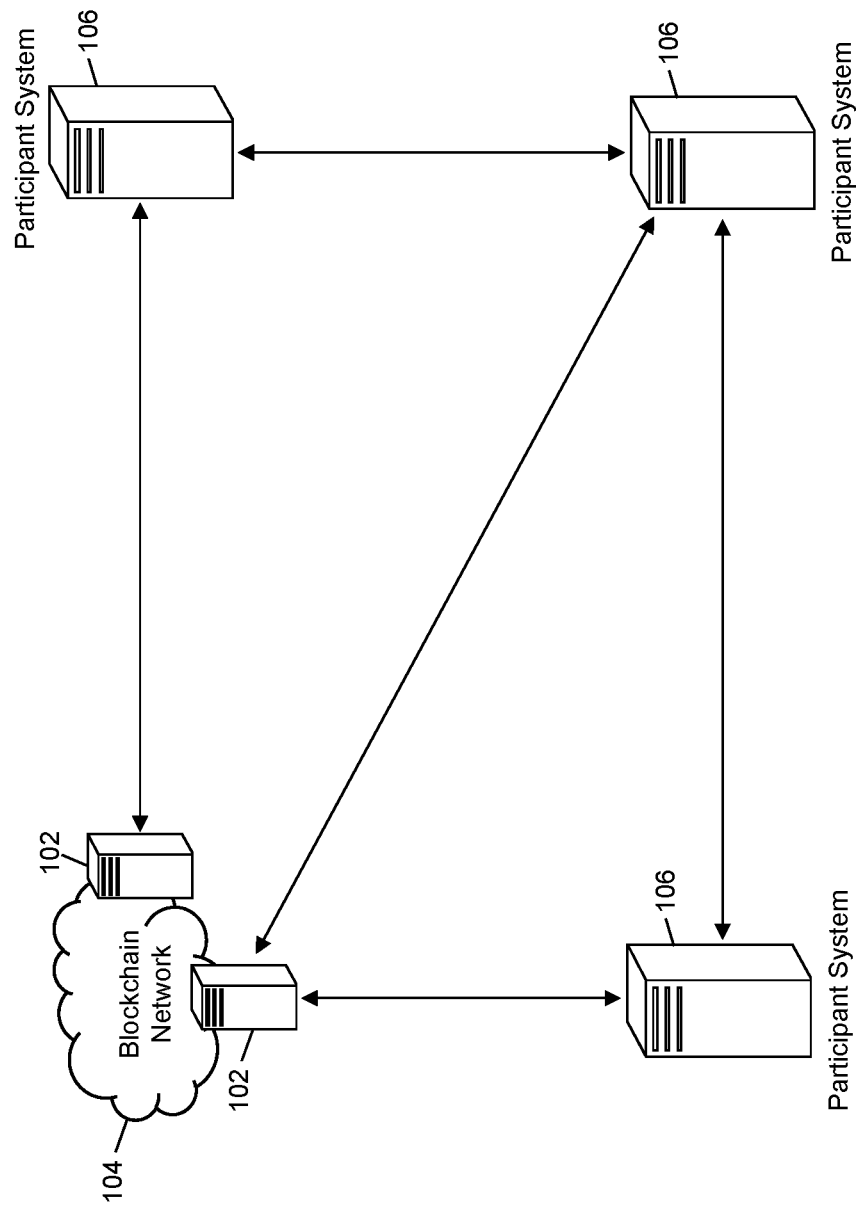
FIG. 1 is a block diagram illustrating a high level system architecture for validating genesis blocks and processing new transactions in a pruned blockchain in accordance with exemplary embodiments.

FIG. 1 illustrates a system 100 for the validation of genesis blocks and processing of new blockchain transactions in a pruned blockchain through the use of a state database and configuration values.

Figure 2:
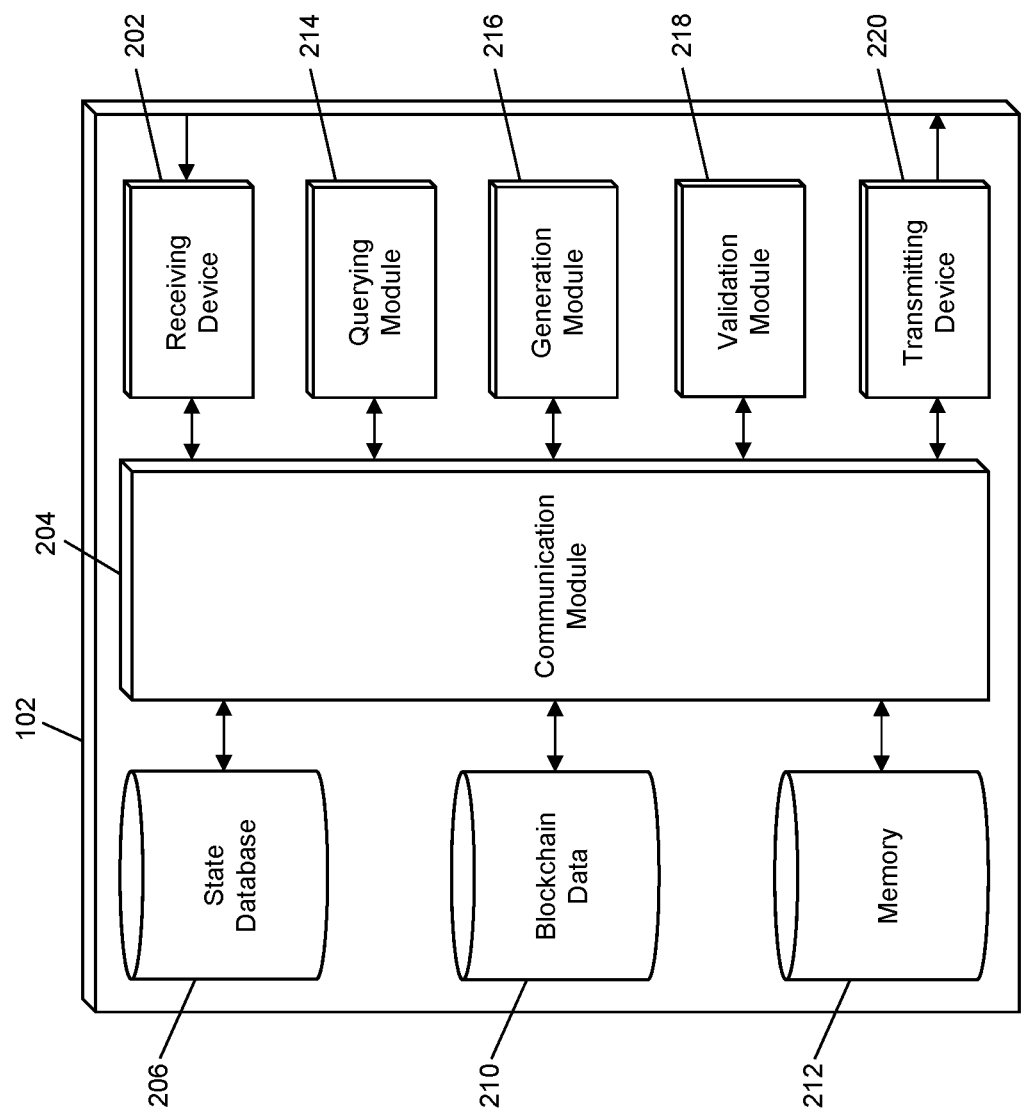
FIG. 2 is a block diagram illustrating a blockchain node of the system of FIG. 1 for validating genesis blocks and processing new transactions in a pruned blockchain in accordance with exemplary embodiments.
Figure 7:
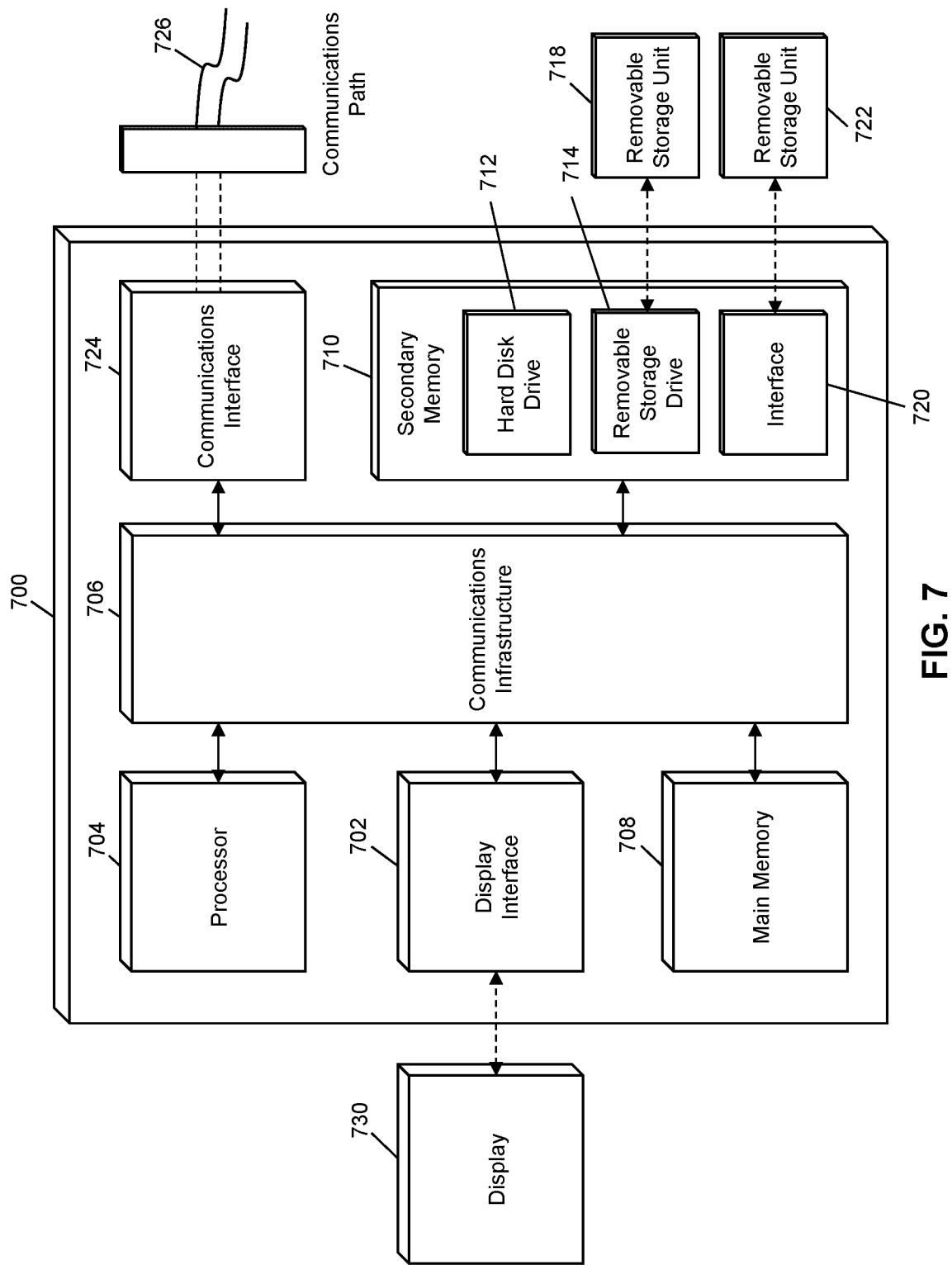
FIG. 7 is a block diagram illustrating a computer system architecture in accordance with exemplary embodiments.

The system 100 may include a blockchain network 104. Each blockchain network 104 may be comprised of a plurality of different blockchain nodes 102. In some embodiments, one or more blockchain nodes 102 may be a node in more than one blockchain network 104. Each blockchain node may be a computing system, such as illustrated in FIGS. 2 and 7, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the data reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 102 in the blockchain network 104 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device (e.g., participant system 106) that stores the private key for use thereof in blockchain transactions. For instance, each computing device may each have their own private key for respective cryptographic key pairs, and may each be a blockchain wallet for use in transactions with the blockchain associated with the blockchain network 104. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency (e.g., a first participant system 106) that is generated using the sender's private key, a blockchain address of the recipient of currency (e.g., a second participant system 106) generated using the recipient's public key, and a blockchain currency amount that is transferred or other data being stored. In the case of the blockchain being used for data storage separate from currency, the currency amount may be replaced by such other data. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a blockchain node 102 in the blockchain network 104, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block may be validated by other nodes 102 in the blockchain network 104 before being added to the blockchain and distributed to all of the blockchain nodes 102 in the blockchain network 104 in traditional blockchain implementations. In cases where a blockchain data value may not be related to a blockchain transaction, but instead the storage of other types of data, blockchain data values may still include or otherwise involve the validation of a digital signature.

In some embodiments, the blockchain may utilize smart contracts. In such embodiments, smart contracts may be stored in the blockchain associated with the blockchain network 104. A smart contract may be a contract that is self-executing, where a result of the smart contract after execution may be a new blockchain data value, such as a new blockchain transaction, that is to be stored in the blockchain. A smart contract may be executed using one or more inputs, also referred to as dispatches, which then generates a new blockchain data value. The smart contract may be self-executing such that the smart contract will automatically trigger execution when a valid dispatch is identified, or will automatically trigger when specific criteria is fulfilled, which may then result in specific dispatches being provided to the smart contract as inputs for execution. In an exemplary embodiment, each dispatch for the smart contract will refer to a prior blockchain data value on the blockchain, such as by using a hash value of the blockchain data value or a unique identification value stored in the blockchain with the blockchain data value. When a dispatch is fed as input to the smart contract, execution of the smart contract may result in a new blockchain data value, such as a blockchain transaction, which, in some instances, may depend on the dispatch itself, such as where a value in the dispatch may result in a different output from execution of the smart contract.

In the system 100, the blockchain nodes 102 in the blockchain network 104 may be configured to prune the blockchain. Pruning of the blockchain may include the deletion of older blocks in the blockchain from local data storage without affecting the ongoing operation of the blockchain. As discussed in more detail below, the blockchain network 104 may utilize multiple genesis blocks and the use of configuration values and state databases to enable validation of future transactions and retain the immutability of the blockchain even with pruned blocks. Traditionally, a genesis block is the first block in a blockchain, which may include a block header that has a null block reference value or other value that does not represent the hash value of a prior block. In some cases, a genesis block may not include any blockchain data values. In the system 100, a new genesis block may be created, confirmed, and added to the blockchain, where any blocks in the blockchain prior to the new genesis block may be pruned by blockchain nodes 102. To ensure that new transactions are able to be successfully confirmed even when attempting to utilize an unspent transaction output from a pruned block, the blockchain nodes 102 in the system 100 may utilize state databases.

A state database may be a local database stored in a blockchain node 102 or otherwise accessible thereby that includes current unspent transaction outputs in the blockchain. When a block is added to the blockchain, a blockchain node 102 may analyze each new blockchain transaction stored therein (e.g., in blockchain data values in the block) to update its state database with respect to unspent transaction outputs that have been spent and newly generated transaction outputs. The blockchain node 102 may analyze a new blockchain transaction and remove any included unspent transaction outputs from its state database, or otherwise update the state of the unspent transaction outputs as being spent. The blockchain node 102 may also analyze each new blockchain transaction to add any new unspent transaction outputs that result from the transaction into its state database. In some cases, a state value indicating that the transaction output is unspent may also be stored in the database accompanying the transaction output. In some embodiments, the currency amount transferred to the transaction output may also be stored in the state database with the transaction output.

In some embodiments, entries for unspent transactions in the state database may also specify the block in which the unspent transaction was created. For instance, each block in the blockchain may have an identification number associated therewith, which may be random or pseudo-random or may be sequential, such as where the fifteenth block in the chain may have an identification number of 15 (e.g., or 14 if the original genesis block has an identification number of zero). When an unspent transaction is stored in the state database, the identification number for the block in which the unspent transaction was created or last modified may be stored with the unspent transaction in the state database. Such a value may be used in determining if an unspent transaction was created in a block pruned from the blockchain or for quicker identification of the unspent transaction in the chain itself.

When a new blockchain transaction is received by a blockchain node 102 for verification and inclusion in a new block in the blockchain, the blockchain node 102 may validate the transaction, as discussed above. In cases where an unspent transaction output in the new blockchain transaction was stored in a prior block that has been pruned from the blockchain (e.g., identified using the identification value of the block in the state database), the blockchain node 102 may utilize the state database. The blockchain node 102 may query the state database to determine if the unspent transaction output(s) referenced as transaction input(s) in the new blockchain transaction exist in the state database, and are indicated to be unspent, if applicable. In cases where currency amounts are stored in the state database, the blockchain node 102 may further verify that each unspent transaction output is associated with the amount of currency indicated in the new blockchain transaction. If one or more of the unspent transaction outputs cannot be verified using the state database, then the transaction will not be validated and will accordingly not be added to the blockchain. In some cases, the blockchain node 102 may provide a notification to the participant system 106 that submitted the blockchain transaction to indicate the failed validation. If each of the unspent transaction outputs is found in the state database and the blockchain node 102 confirms that the transaction output remains unspent, then the transaction may be confirmed. The blockchain node 102 may then include the new blockchain transaction in a new block that is generated and distributed to the other blockchain nodes 102 in the blockchain network 104 for confirmation and addition to the blockchain. The blockchain node 102 may then update its state database accordingly, as discussed above.

The use of a state database may ensure that all new blockchain transactions can be successfully confirmed and validated even if the transactions attempt to utilize transaction outputs from pruned blocks. By only keeping information regarding unspent transaction outputs, the file size of the state database may remain consistently small without growing over time, while the ongoing pruning of the blockchain itself may ensure that the file size of the blockchain remains at a suitable value. In an exemplary embodiment, each blockchain node 102 in the blockchain network 104 may have its own state database, where the state databases should each store the same data due to the chain being immutable and consistent across all blockchain nodes 102. For instance, as the state database is updated in each blockchain node 102 when a new block is confirmed, and as the new block is distributed to every node in the blockchain, the state database should be consistent across all blockchain nodes 102.

When pruning is desired in the blockchain network 104, a new genesis block may be chosen and its identity is broadcast to all nodes in the blockchain network and stored in a record, referred to herein as a "genesis block record," stored in a blockchain node or nodes 102. A genesis block record may be a record that indicates which block in the chain is the current genesis block. The record may be updated via the chain (e.g., a transaction which when it appears in a block in the chain identifies to blockchain nodes which block has been chosen as the new current genesis block). In some cases, a new genesis block record may be generated or chosen periodically, such as after a specific period of time, after a predetermined number of blocks, after a predetermined number of transactions, or once the blockchain reaches a predetermined file size. The genesis block record may include an ordinal value, which may indicate the number of the genesis block in relation to all past genesis blocks (e.g., the 50th genesis block added to the blockchain may include an ordinal value of 50 or 51). Ordinal values may be used to ensure the proper ordering of the blockchain, to ensure consistency in pruning across the blockchain nodes 102, and also to enable a new blockchain node 102 to participate in the blockchain network 104 by starting at a suitable genesis block with a current state database without the need to obtain the entire blockchain.

When a new genesis block is created or chosen, the blockchain node 102 may distribute the genesis block record to a plurality of other blockchain nodes 102 for confirmation and addition to the blockchain using suitable methods and systems. The current genesis block may have been confirmed and added using the same process as standard blocks (e.g., standard blocks can be blocks that have not been chosen to serve as a genesis block in a genesis block record). In some cases, a standard block may be chosen to serve as a genesis block record. In such cases, the standard block may include data in the block header indicative of the genesis block record, such as the ordinal value. For instance, when the block header for that standard block is being generated, an ordinal value may be included in the block header to signify its being chosen as a genesis block. In some such cases, blocks that are not genesis block records may have a zero or null value stored in the ordinal value in the block header, such that any block with a non-zero value as the ordinal value may serve as a genesis block record for the blockchain. As part of the confirmation of a new genesis block record, a blockchain node 102 may ensure that the ordinal value is correct. Once a genesis block record has been confirmed and added to the nodes of the blockchain, a blockchain node 102 may be free to prune any blocks prior to that genesis block record from its local data stores. In some embodiments, a blockchain network 104 may be configured such that its blockchain nodes 102 retain the blocks within a predetermined distance from the newest or current genesis block record (e.g., every block going back to a current genesis block, five ordinal values before the current genesis block identified in the genesis blockchain record, etc.).

In some embodiments, genesis block records may include a configuration value. The configuration value may include any data that may be needed to maintain operation of the blockchain following the pruning of the blocks prior to the genesis block. In one example, the configuration value may include all current unspent transaction outputs as of the genesis block record (or a separate state database), such as may be identified by the blockchain node 102 generating the genesis block record using its state database. In cases where the blockchain is configured to use smart contracts, the configuration value may include state information for smart contracts that are present on the blockchain. For instance, a smart contract and its current input information or dispatches may be stored in the configuration value in the genesis block record. In some instances, a configuration value may be a hash value of such data, such as the unspent transaction outputs or state configuration data for pending smart contracts.

In some embodiments, each blockchain node 102 may use its state database to store state information regarding smart contracts in the blockchain in addition to the unspent transaction outputs. In such embodiments, when a new block is added to the blockchain, a blockchain node 102 may analyze the blockchain data values therein to determine if any smart contract state changes are made, such as by input transactions being added to the blockchain, outputs of smart contracts being added to the blockchain, updates to a smart contract added, etc. The blockchain node 102 may identify any such instances and update the state of the smart contract in its state database accordingly. In an example, a smart contract may be used as an escrow where a payment is made from participant A to an escrow wallet to remain there until a contract executed by participant B is added to the blockchain, where the payment is made from the escrow wallet to participant B once the contract is added or where the payment is reverted to participant A if a time period for adding the contract expires. A blockchain node 102 may store state information for the smart contract as events pertaining to the smart contract occur, such as to reflect awaiting payment from the participant A to the escrow wallet, to include a transaction identifier or blockchain data entry for the payment from participant A to the escrow wallet, etc. If the blockchain is pruned to where the block that includes the blockchain data entry for payment from the participant A to the escrow wallet, a blockchain node 102 may still be able to determine that the payment has been made successfully using its state database, such that when the contract executed by participant B is added to the blockchain, the smart contract may be executed to facilitate payment to participant B.

In some such embodiments, when a new genesis block record is generated, the configuration value may be comprised of or include an aggregation of all smart contract state changes that occurred in the blockchain since the prior genesis block record was chosen. In some cases, the configuration value may include an ordered list of each state change. In other cases, the configuration value may include the root of a Merkle tree of the state changes, where the state changes may be ordered in the Merkle tree in a known manner, such as using time ordering. When the new genesis block record is generated and distributed to other blockchain nodes 102, part of the validation of the new genesis block record may include validation of the configuration value. A blockchain node 102 that receives a proposed new genesis block record may identify all state changes in smart contracts since the most recent genesis block record and generate a configuration value using an aggregation of the identified state changes. The generated configuration value may be compared to the configuration value in the proposed genesis block record. If the configuration values match, then the new genesis block record may be determined by the blockchain node 102 to be valid and the blockchain node 102 may respond to the proposed genesis block record with a confirmation message. If the configuration values do not match, the blockchain node 102 may reject the proposed blockchain node 102. As a result, the configuration value may be used to ensure that the state of all pending smart contracts is up to date across each of the blockchain nodes 102.

In some embodiments, configuration values may be used for state changes among other data in the blockchain separate from smart contracts. For example, in some instances, the configuration value may also be used to store an aggregation of the current state database of a blockchain node 102 when a new genesis block record is generated. In some such instances, the configuration value may include an aggregation of smart contract state changes and the aggregation of the current state database separately. In other such instances, both aggregations may be further aggregated together for a single resulting value that may be confirmed by any blockchain node 102 that receives the proposed genesis block record. Other state information that may be stored in a configuration value relating to the blockchain may include, for instance, genesis block record data, ordinal numbering data, node permission data, etc.

The methods and systems discussed herein may enable blockchain nodes 102 to regularly prune old blocks in the blockchain, which can drastically reduce file sizes and bandwidth used by blockchain nodes 102 in the blockchain network 104. By using state databases, the ongoing operation of the blockchain can continue without any node having to retain any of the pruned blocks while still preventing the possibility of double spend for any blockchain transactions. The use of new genesis block records with ordinal values ensures that all blockchain nodes 102 can be regularly kept up to date and also facilitates the addition of new blockchain nodes 102 faster than using traditional blockchains. The use of configuration values in genesis block records that include aggregations of smart contract state changes also ensures that smart contracts can still be utilized in a blockchain that uses pruning as discussed above. Accordingly, the methods and systems discussed herein provide for all of the functionality of existing blockchains, while still enabling significant pruning to drastically reduce blockchain data sizes.

Blockchain Node

FIG. 2 illustrates an embodiment of a blockchain node 102, such as the blockchain node 102 in the system 100. It will be apparent to persons having skill in the relevant art that the embodiment of the blockchain node 102 illustrated in FIG. 2 is provided as illustration only and may not be exhaustive to all possible configurations of the blockchain node 102 suitable for performing the functions as discussed herein. For example, the computer system 700 illustrated in FIG. 7 and discussed in more detail below may be a suitable configuration of the blockchain node 102.

The blockchain node 102 may include a receiving device 202. The receiving device 202 may be configured to receive data over one or more networks via one or more network protocols. In some instances, the receiving device 202 may be configured to receive data from other blockchain nodes 102, participant systems 106, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by other blockchain nodes 102, which may be superimposed or otherwise encoded with blockchain data values, blocks, blockchain transaction data, proposed genesis block records, state database data, smart contract state data, confirmation messages, etc. The receiving device 202 may also be configured to receive data signals electronically transmitted by participant systems 106, which may be superimposed or otherwise encoded with new blockchain data values, smart contracts, etc.

The blockchain node 102 may also include a communication module 204. The communication module 204 may be configured to transmit data between modules, engines, databases, memories, and other components of the blockchain node 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the blockchain node 102 and external components of the blockchain node 102, such as externally connected databases, display devices, input devices, etc. The blockchain node 102 may also include a processing device. The processing device may be configured to perform the functions of the blockchain node 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The blockchain node 102 may include a state database 206. The state database 206 may be configured to store state information for unspent transaction outputs in the blockchain, and smart contract state information, as applicable, using a suitable data storage format and schema. The state database 206 may be a relational database that utilizes structured query language for the storage, identification, modifying, updating, accessing, etc. of structured data sets stored therein. State information may include unspent transaction outputs, associated currency amounts, changes in the state of a transaction output, input values for smart contracts, outputs for a smart contract, smart contract dispatch data, etc.

The blockchain node 102 may also include blockchain data 210, which may be stored in a memory 212 of the blockchain node 102 or stored in a separate area within the blockchain node 102 or accessible thereby. The blockchain data 210 may include a blockchain, which may be comprised of a plurality of blocks and be associated with the blockchain network 104. The blockchain data 210 may also or alternatively include any data associated with one or more blockchain wallets that may be used by the blockchain node 102, such as cryptographic key pairs, unspent transaction outputs, digital asset amounts, network identifiers for the blockchain networks 104, smart contracts, signature generation algorithms, encryption algorithms, communication information for third party services, etc. The blockchain data 210 may also include data regarding the aggregation of data in the state database 206, data for the generation of new genesis block records, etc.

The blockchain node 102 may also include a memory 212. The memory 212 may be configured to store data for use by the blockchain node 102 in performing the functions discussed herein, such as public and private keys, symmetric keys, etc. The memory 212 may be configured to store data using suitable data formatting methods and schema and may be any suitable type of memory, such as read-only memory, random access memory, etc. The memory 212 may include, for example, encryption keys and algorithms, communication protocols and standards, data formatting standards and protocols, program code for modules and application programs of the processing device, and other data that may be suitable for use by the blockchain node 102 in the performance of the functions disclosed herein as will be apparent to persons having skill in the relevant art. In some embodiments, the memory 212 may be comprised of or may otherwise include a relational database that utilizes structured query language for the storage, identification, modifying, updating, accessing, etc. of structured data sets stored therein. The memory 212 may be configured to store, for example, cryptographic keys, salts, nonces, communication information for other computing systems, generation algorithms, cryptographic key pairs, algorithms for calculation of currency amounts, etc.

The blockchain node 102 may include a querying module 214. The querying module 214 may be configured to execute queries on databases to identify information. The querying module 214 may receive one or more data values or query strings, and may execute a query string based thereon on an indicated database, such as the state database 206 of the blockchain node 102 to identify information stored therein. The querying module 214 may then output the identified information to an appropriate engine or module of the blockchain node 102 as necessary. The querying module 214 may, for example, execute a query on the state database 206 to look for unspent transaction outputs in a received, proposed blockchain transaction to determine if the transaction can be validated.

The blockchain node 102 may also include a generation module 216. The generation module 216 may be configured to generate data for use by the blockchain node 102 in performing the functions discussed herein. The generation module 216 may receive instructions as input, may generate data based on the instructions, and may output the generated data to one or more modules of the blockchain node 102. For example, the generation module 216 may be configured to generate cryptographic key pairs, generate digital signatures, generate blockchain data values, generate new blocks, generate block and data reference values, aggregate state changes, generate genesis block records, etc.

The blockchain node 102 may also include a validation module 218. The validation module 218 may be configured to perform validations for the blockchain node 102 as part of the functions discussed herein. The validation module 218 may receive instructions as input, which may also include data to be used in performing a validation, may perform a validation as requested, and may output a result of the validation to another module or engine of the blockchain node 102. The validation module 218 may, for example, be configured to validate digital signatures using suitable signature generation algorithms and keys, validate new blockchain transactions, validate smart contracts, validate configuration values in proposed genesis block records, etc.

The blockchain node 102 may also include a transmitting device 220. The transmitting device 220 may be configured to transmit data over one or more networks via one or more network protocols. In some instances, the transmitting device 220 may be configured to transmit data to other blockchain nodes 102, participant systems 106, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to other blockchain nodes, which may be superimposed or otherwise encoded with blockchain data values, blocks, blockchain transaction data, proposed genesis block records, state database data, smart contract state data, confirmation messages, etc. The transmitting device 220 may also be configured to electronically transmit data signals to participant systems 106, which may be superimposed or otherwise encoded with transaction notifications, transaction identifiers, etc.

Process for Processing New Blockchain Transactions

Figure 3:
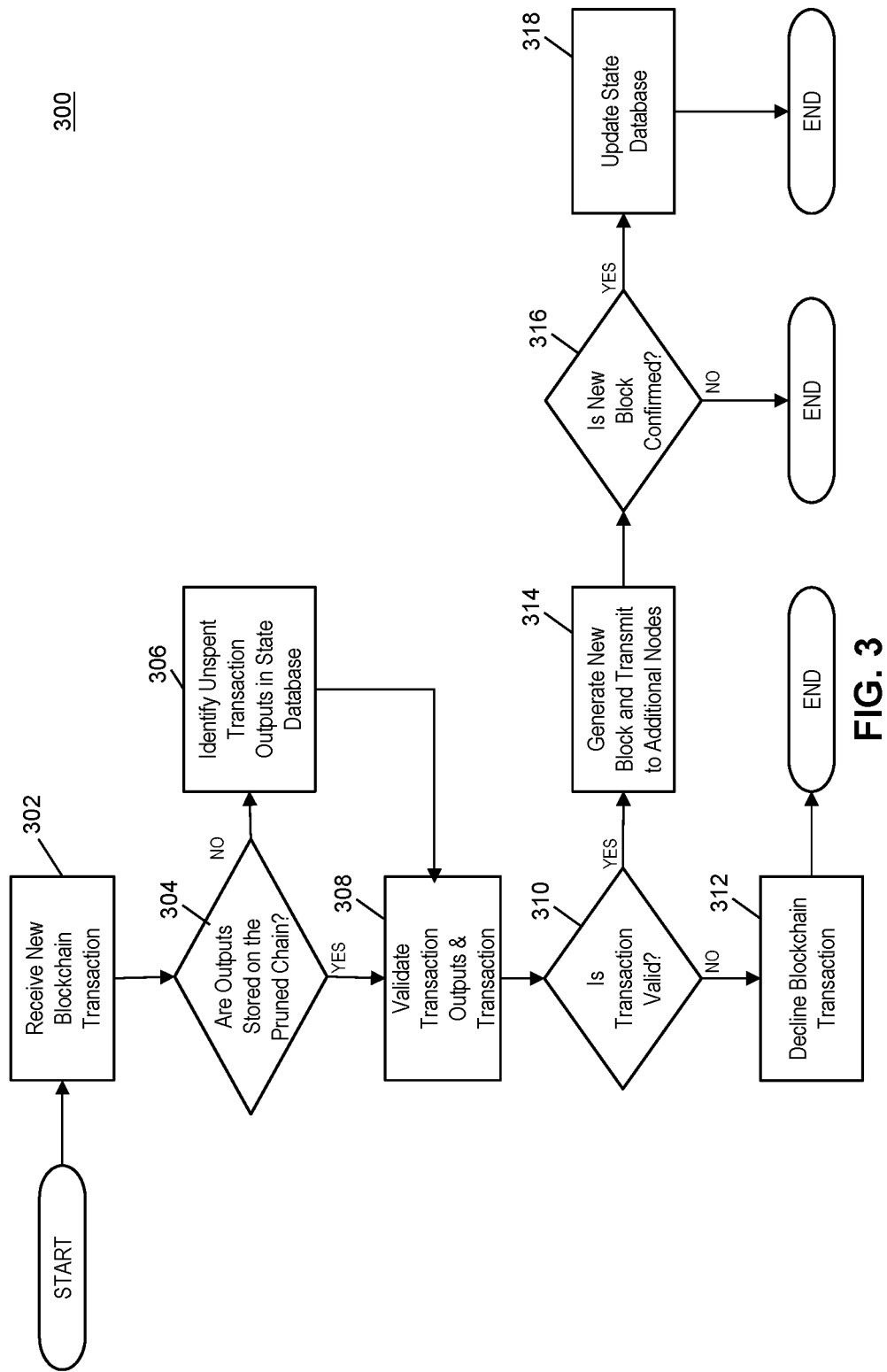
FIG. 3 is a flow diagram illustrating a process for processing new blockchain transactions in a pruned blockchain in the system of FIG. 1 in accordance with exemplary embodiments.

FIG. 3 illustrates a process 300 for the processing of a new blockchain transaction in the system 100 by a blockchain node 102 in a pruned blockchain.

In step 302, the receiving device 202 of the blockchain node 102 may receive a new blockchain transaction from a participant system 106. The new blockchain transaction may include at least one unspent transaction output as input for the new blockchain transaction, one or more output addresses, and, for each output address, a corresponding currency amount. In some cases, each unspent transaction output may also include a corresponding currency amount. In other cases, the corresponding currency amount for an unspent transaction output may not be included as all currency associated with the unspent transaction output will be transferred as part of the blockchain transaction. In step 304, the blockchain node 102 may determine if the unspent transaction output(s) in the new blockchain transaction are included in the locally stored copy of the blockchain (e.g., not included in pruned blocks). The determination may utilize transaction identifiers or information in the state database 206.

If, in step 304, the blockchain node 102 determines that the unspent transaction output(s) were included in blocks that have been pruned from the blockchain and therefore are not stored on the pruned chain, then, in step 306, the querying module 214 of the blockchain node 102 may execute a query on the state database 206 of the blockchain node 102 to identify each of the unspent transaction outputs therein and/or to identify if each transaction output is still unspent according to its stored state information. If, in step 304, the blockchain node 102 determines that the unspent output(s) were not included in blocks that have been pruned from the blockchain, and therefore are stored on the pruned chain, then process 300 skips step 306 and continues directly to step 308. In step 308, the validation module 218 of the blockchain node 102 may validate the transaction outputs to determine if each is still unspent, and validate the transaction to ensure that the transaction inputs are associated with enough blockchain currency to accommodate the transaction output(s) as indicated in the new blockchain transaction. In step 310, the blockchain node 102 may determine if the transaction is valid as a result of the validations performed in step 308. If one or more of the validations fail (e.g., there is not enough available currency, one or more of the inputs have already been spent, a digital signature is not successfully validated, etc.) then, in step 312, the blockchain node 102 may decline the new blockchain transaction and the process 300 completed. In some cases, the transmitting device 220 of the blockchain node 102 may electronically transmit a notification message to the participant system 106 that submitted the transaction to inform them of the validation and, in some instances, the cause of the failed validation.

If the validation of the blockchain transaction is successful, then, in step 314, the generation module 216 of the blockchain node 102 may generate a new block that includes the validated blockchain transaction and the transmitting device 220 of the blockchain node 102 may electronically transmit the new block to a plurality of additional nodes 102 in the blockchain network 104. The additional blockchain nodes 102 may validate the new block and, if the block is successfully validated, return a confirmation message to the blockchain node 102. In step 316, the blockchain node 102 may determine if the new block has been confirmed by a majority of the additional blockchain nodes 102, which may be determined based on the number of received confirmation messages. If the new block is not successfully confirmed, then the process 300 may end and the blockchain node 102 may generate a new block or await a new block from another blockchain node 102 for confirmation. If the new block is successfully confirmed, then, in step 318, the querying module 214 of the blockchain node 102 may execute one or more queries on the state database 206 to update the state database to remove or otherwise indicate spending of the transaction outputs used as input in each blockchain transaction in the confirmed block and to add the transaction outputs of each of the blockchain transactions in the confirmed block. The process 300 may then be completed.

Process for Validating a New Genesis Block Record

Figure 4:
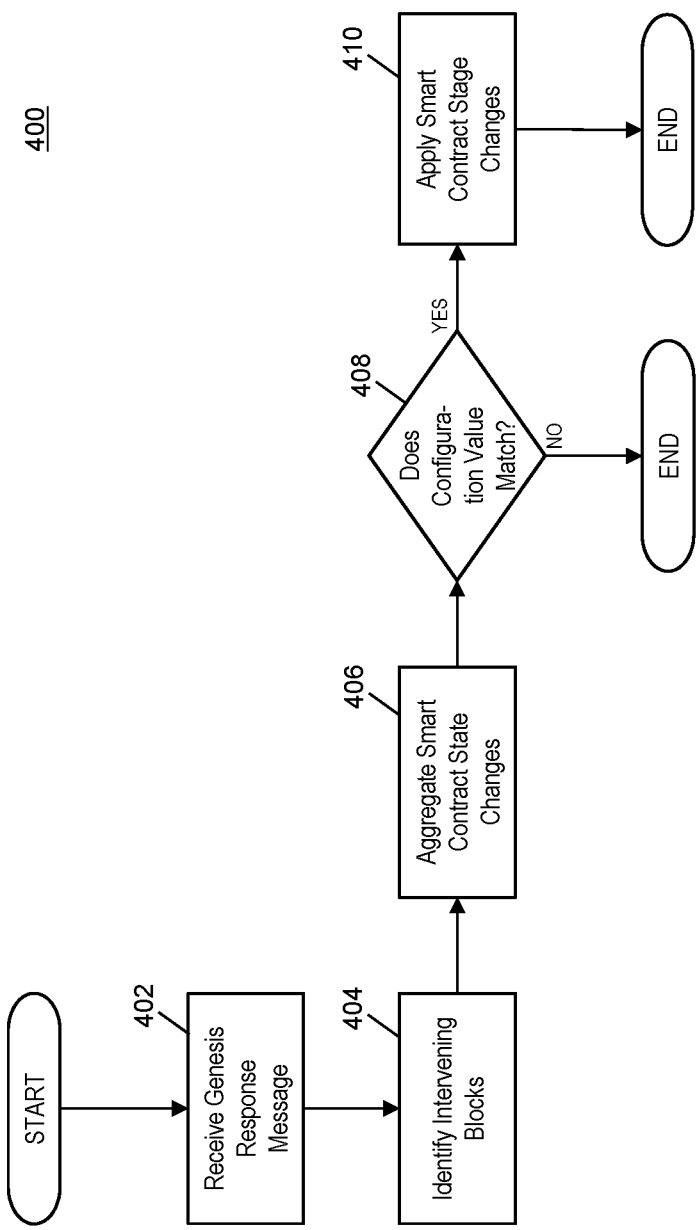
FIG. 4 is a flow diagram illustrating a process for validating genesis blocks in a pruned blockchain in accordance with exemplary embodiments.

FIG. 4 illustrates a process 400 for the validation of a new genesis block record in the blockchain network 104 by a blockchain node 102 in the system 100.

In step 402, the receiving device 202 of the blockchain node 102 may receive a genesis block record response message from another blockchain node 102 in the blockchain network 104, where the response message includes a new genesis block record or data for inclusion in a new genesis block record including at least the ordinal value for the genesis block record and a configuration value. In step 404, the querying module 214 of the blockchain node 102 may execute a query on the blockchain data 210 of the blockchain node 102 to identify any intervening blocks that have been added to the blockchain between the most recent genesis block record and the newly proposed genesis block record (e.g., according to ordinal value).

In step 406, the generation module 216 of the blockchain node 102 may identify and aggregate the state changes of all smart contracts in the blockchain as indicated in the intervening blocks. The generation module 216 may use the aggregated state changes and generate a test configuration value therefrom, such as by generating a Merkle tree using the state changes where the test configuration value is the root of the Merkle tree. In step 408, the validation module 218 of the blockchain node 102 may attempt a validation of the configuration value received in the genesis response message using the test configuration value. If the test configuration value and the received configuration value do not match, then the process 400 may be ended. In some cases, the transmitting device 220 of the blockchain node 102 may return a notification to the blockchain node 102 that submitted the response message that indicates that the validation was unsuccessful. If the test configuration value and the received configuration value match, then, in step 410, the querying module 214 of the blockchain node 102 may execute one or more queries on the state database 206 to apply the identified state changes to store smart contract state information. The genesis block record may thereby be confirmed, and the blockchain node 102 may also update the blockchain data 210 accordingly, as applicable.

Exemplary Method for Processing New Blockchain Transactions

Figure 5:
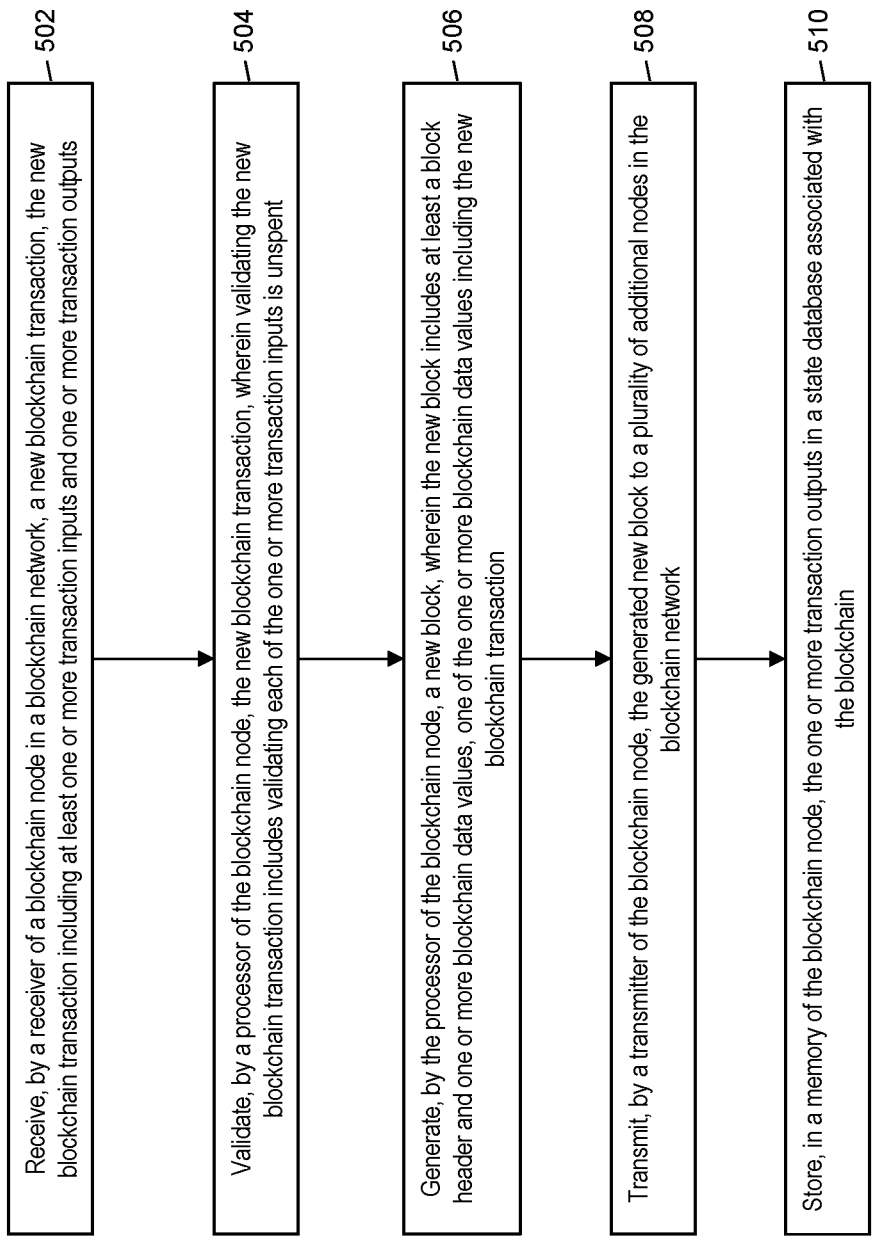
FIG. 5 is a flow chart illustrating an exemplary method for processing a new blockchain transaction in a blockchain configured to enable pruning prior to a current genesis block in accordance with exemplary embodiments.

FIG. 5 illustrates a method 500 for the processing of new blockchain transactions in a blockchain that is configured to enable pruning prior to a current genesis block.

In step 502, a new blockchain transaction may be received by a receiver (e.g., receiving device 202) of a blockchain node (e.g., blockchain node 102) in a blockchain network (e.g., blockchain network 104), the new blockchain transaction including at least one or more transaction inputs and one or more transaction outputs. In step 504, the new blockchain transaction may be validated by a processor (e.g., validation module 218) of the blockchain node, wherein validating the new blockchain transaction includes validating that each of the one or more transaction inputs is unspent.

In step 506, a new block may be generated by the processor (e.g., generation module 216) of the blockchain node, wherein the new block includes at least a block header and one or more blockchain data values, one of the one or more blockchain data values including the new blockchain transaction. In step 508, the generated new block may be transmitted by a transmitter (e.g., transmitting device 220) of the blockchain node to a plurality of additional nodes (e.g., blockchain nodes 102) in the blockchain network. In step 510, the one or more transaction outputs may be stored, in a memory (e.g., memory 212) of the blockchain node, in a state database (e.g., state database 206) associated with the blockchain.

In one embodiment, the method 500 may further include receiving, by the receiver of the blockchain node, a confirmation message from a majority of the plurality of additional nodes prior to storing the one or more transaction outputs. In some embodiments, validating that each of the one or more transaction inputs is associated with the corresponding currency amount in the blockchain may include identifying one or more earlier blockchain data values stored in one or more preceding blocks in the blockchain that include the one or more transaction outputs. In one embodiment, validating that each of the one or more transaction inputs is associated with the corresponding currency amount in the blockchain may include identifying each of the one or more transaction inputs and the corresponding currency amount in the state database. In some embodiment, validating that each of the one or more transaction inputs is associated with the corresponding currency amount in the blockchain may include identifying each of the one or more transaction inputs and the corresponding currency amount in a configuration value in a most recent genesis block in the blockchain.

Exemplary Method for Confirming Configuration in a Blockchain

Figure 6:
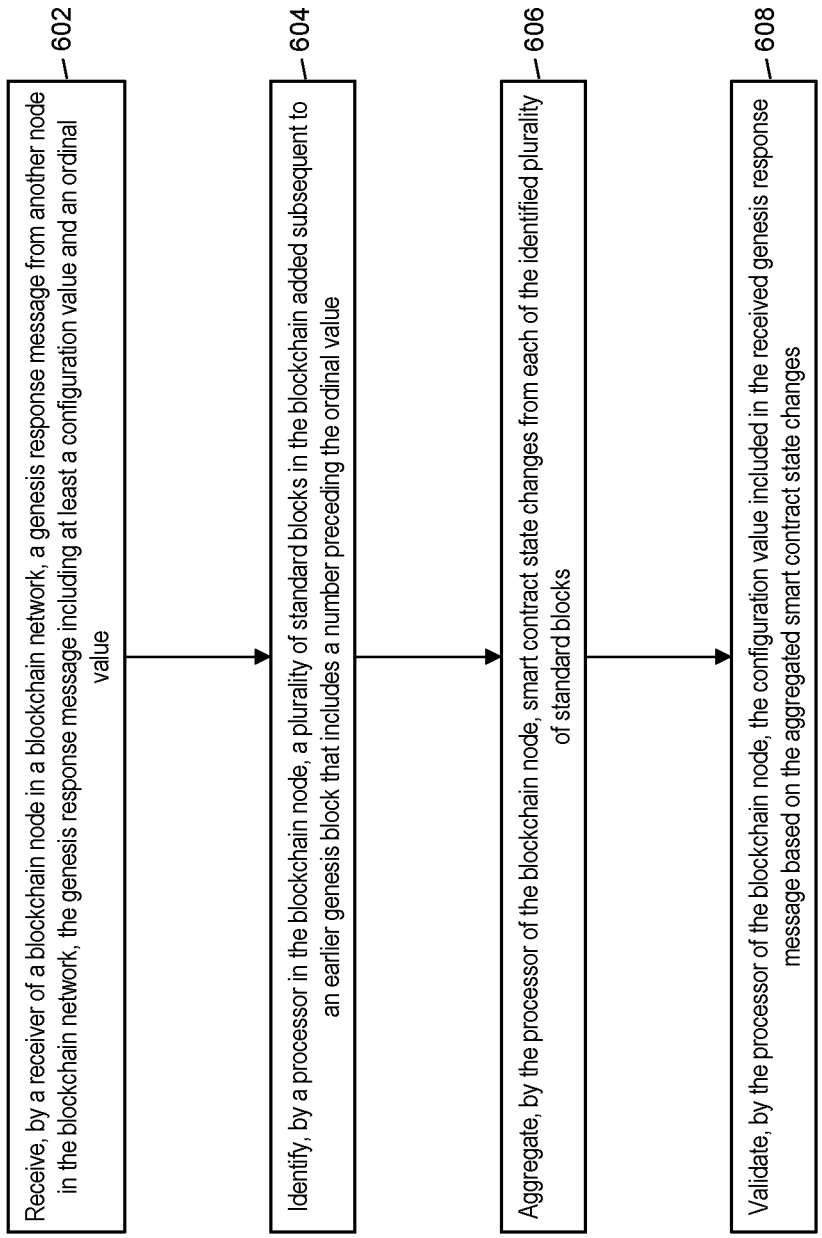
FIG. 6 is a flow chart illustrating an exemplary method for confirming configuration of a new genesis block in a blockchain configured to enable pruning before the new genesis block in accordance with exemplary embodiments.

FIG. 6 illustrates a method 600 for confirming the configuration of a new genesis block in a blockchain configured to enable pruning before the new genesis block.

In step 602, a genesis response message may be received by a receiver (e.g., receiving device 202) of a blockchain node (e.g., blockchain node 102) in a blockchain network (e.g., blockchain network 104) from another node in the blockchain network, the genesis response message including at least a configuration value and an ordinal value. In step 604, a plurality of standard blocks in the blockchain added subsequent to an earlier genesis block may be identified by a processor (e.g., querying module 214) in the blockchain node that includes a number preceding the ordinal value.

In step 606, smart contract state changes may be aggregated by the processor (e.g., generation module 216) from each of the identified plurality of standard blocks. In step 608, the configuration value included in the received genesis response message may be validated by the processor (e.g., validation module 218) of the blockchain node based on the aggregated smart contract state changes.

In one embodiment, the method 600 may further include applying, by the processor of the blockchain node, the aggregated smart contract state changes to one or more corresponding smart contracts in a state database (e.g., state database 206) associated with the blockchain stored in a memory (e.g., memory 212) of the blockchain node. In some embodiments, the method 600 may further include generating, by the processor of the blockchain node, a Merkle root using the aggregated smart contract state changes, wherein validating the configuration value includes comparing the configuration value with the generated Merkle root for a match.

Computer System Architecture

FIG. 7 illustrates a computer system 700 in which embodiments of the present disclosure, or portions thereof, may be implemented as computer-readable code. For example, the blockchain node 102 of FIGS. 1 and 2 may be implemented in the computer system 700 using hardware, non-transitory computer readable media having instructions stored thereon, or a combination thereof and may be implemented in one or more computer systems or other processing systems. Hardware may embody modules and components used to implement the methods of FIGS. 3-6.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3-6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for processing new blockchain transactions and confirming configuration of a new genesis block in a blockchain configured to enable pruning prior to a current genesis block. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for confirming configuration of a new genesis block in a blockchain configured to enable pruning before the new genesis block, comprising:
receiving, by a receiver of a blockchain node in a blockchain network, a genesis response message from another node in the blockchain network, the genesis response message including at least a (1) configuration value that is an aggregation of identified state changes in smart contracts since a most recent genesis block and (2) an ordinal value that indicates a number of the new genesis block in relation to all past genesis blocks;
identifying, by a processor in the blockchain node, a plurality of blocks in the blockchain added subsequent to an earlier genesis block that includes a number preceding the ordinal value;
aggregating, by the processor of the blockchain node or a processor of another blockchain node in the same blockchain, state changes from each of the identified plurality of blocks; and
validating, by the processor of the blockchain node, the configuration value included in the received genesis response message based on the aggregated state changes.

2. The method of claim 1, further comprising:
applying, by the processor of the blockchain node, the aggregated state changes to one or more corresponding smart contracts in a state database associated with the blockchain stored in a memory of the blockchain node.

3. The method of claim 1, further comprising:
generating, by the processor of the blockchain node, a Merkle root using the aggregated state changes, wherein
validating the configuration value includes comparing the configuration value with the generated Merkle root for a match.

4. A system for confirming configuration of a new genesis block in a blockchain configured to enable pruning prior to the current genesis block, comprising:
a blockchain network;
another node in the blockchain network; and
a blockchain node in the blockchain network including
a receiver receiving a genesis response message from another node in the blockchain network, the genesis response message including at least a (1) configuration value that is an aggregation of identified state changes in smart contracts since a most recent genesis block record and (2) an ordinal value that indicates a number of the new genesis block in relation to all past genesis blocks, and
a processor
identifying a plurality of blocks in the blockchain added subsequent to an earlier genesis block that includes a number preceding the ordinal value,
aggregating state changes from each of the identified plurality of blocks, and
validating the configuration value included in the received genesis response message based on the aggregated state changes.

5. The system of claim 4, wherein the processor of the blockchain node further applies the aggregated state changes to one or more corresponding smart contracts in a state database associated with the blockchain stored in a memory of the blockchain node.

6. The system of claim 4, wherein
the processor of the blockchain node further generates a Merkle root using the aggregated state changes, and
validating the configuration value includes comparing the configuration value with the generated Merkle root for a match.

* * * * *